United States Patent

McMullen

[15] 3,645,558
[45] Feb. 29, 1972

[54] BICYCLE TRAINER VELOCIPEDE

[72] Inventor: Wayne W. McMullen, Coon Rapids, Minn.
[73] Assignee: Frank C. Freidheim, Minneapolis, Minn.
[22] Filed: Mar. 31, 1970
[21] Appl. No.: 24,222

[52] U.S. Cl. ............................................. 280/270, 280/87
[51] Int. Cl. ............................................................. B62k 5/08
[58] Field of Search ................. 280/87, 92, 93, 270, 263, 62, 280/1.182, 1.204

[56] References Cited

UNITED STATES PATENTS

| | | | |
|---|---|---|---|
| 3,237,961 | 3/1966 | McMullen | 280/87 |
| 776,078 | 11/1904 | Murphy | 280/87 UX |
| 2,696,387 | 12/1954 | Nordin | 280/87 X |
| 2,134,515 | 10/1938 | Hoskyns | 280/104 |
| 2,788,217 | 4/1957 | Patterson | 280/1.204 X |

FOREIGN PATENTS OR APPLICATIONS

| | | | |
|---|---|---|---|
| 961,917 | 5/1950 | France | 280/1.182 |
| 1,158,527 | 6/1958 | France | 280/1.182 |

*Primary Examiner*—Benjamin Hersh
*Assistant Examiner*—John P. Silverstrim
*Attorney*—Berman, Davidson and Berman

[57] ABSTRACT

A velocipede having swingable rear wheel mounts controlled by the steering of the velocipede so that on turning the front wheel of the velocipede the swinging rear wheel mounts are swung oppositely to cause the velocipede to bank in the same manner as the bicycle is banked in making a turn. The velocipede rider is thus trained in the motions a bicycle will make on turning to assist in preparing him to ride a bicycle.

3 Claims, 4 Drawing Figures

Patented Feb. 29, 1972  3,645,558

INVENTOR.
WAYNE W. McMULLEN,
BY
Berman, Davidson & Berman
ATTORNEYS.

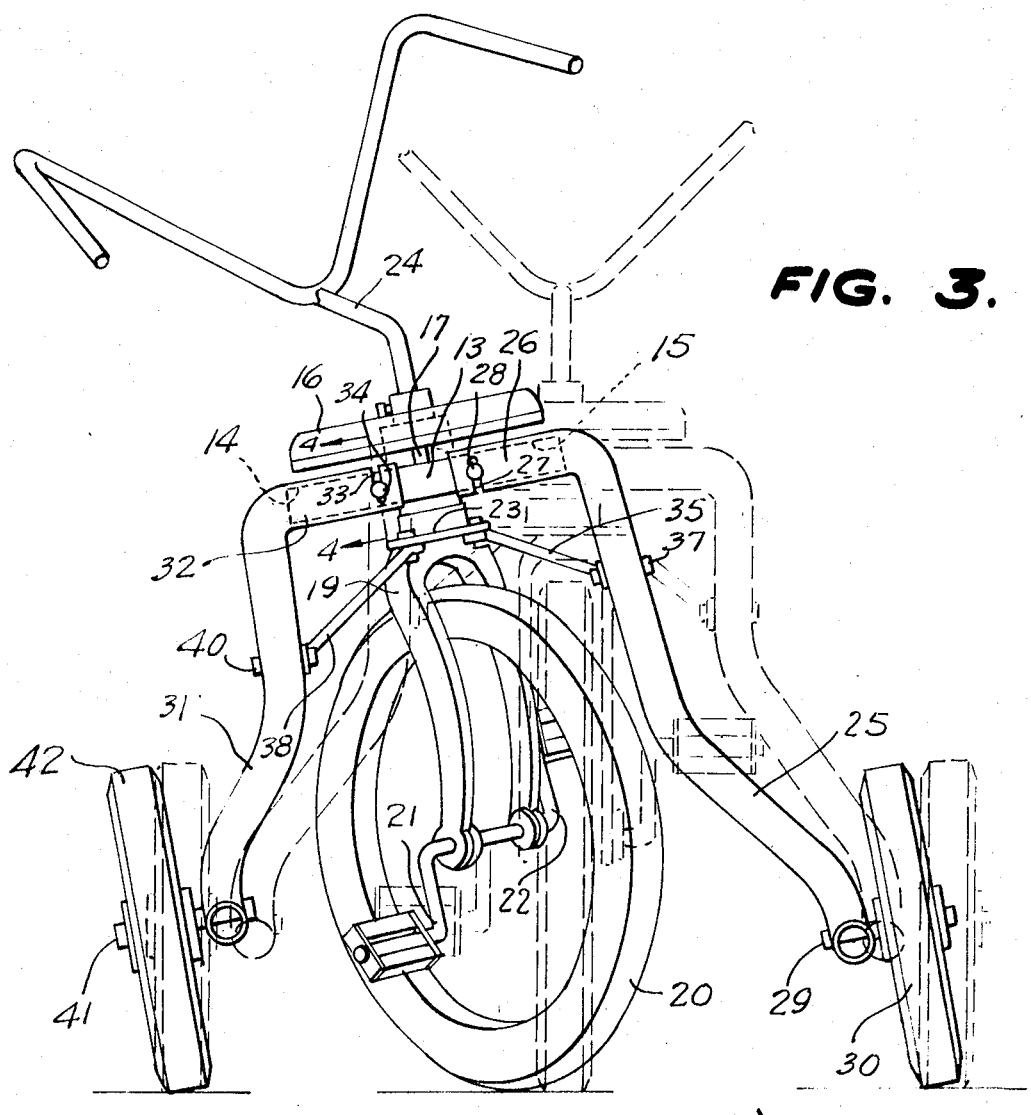
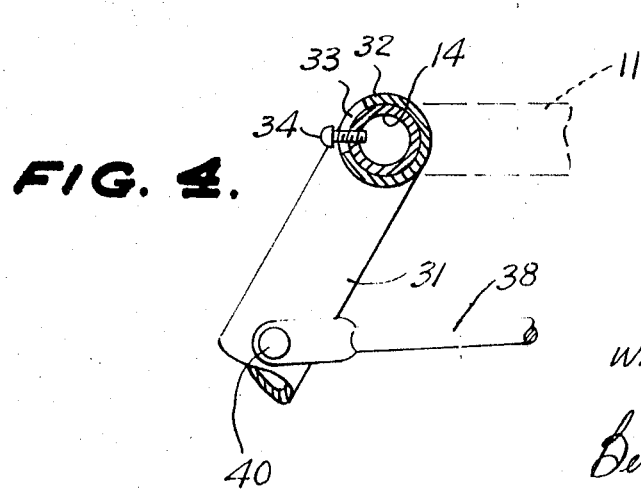

BICYCLE TRAINER VELOCIPEDE

BACKGROUND OF THE INVENTION

1. Field of the Invention

The present invention relates to velocipedes and particularly to velocipedes which will assist the rider in becoming accustomed to the motions made in riding a bicycle.

2. Description of the Prior Art

The present invention is an improvement on my prior U.S. Pat. No. 3,237,961 issued Mar. 1, 1966, and titled "Means in a Vehicle for Maintaining Coordination in the Vehicle's Turning and Lateral Sloping."

SUMMARY OF THE INVENTION

The present invention is directed to a velocipede having steering control means for swinging the rear wheels oppositely to cause the velocipede to lean into the turn in the same manner as a bicycle leans into the turn.

The primary object of the invention is to provide a velocipede for training the rider in the motions normally encountered in riding a bicycle.

Other objects and advantages will become apparent in the following specification when considered in light of the attached drawings.

BRIEF DESCRIPTION OF THE DRAWINGS

FIG. 3 is an enlarged rear elevation of the invention shown leaning into a curve with its upright position shown in broken lines; and FIG. 4 is an enlarged fragmentary vertical sectional view taken along the line 4—4 of FIG. 3 looking in the direction of the arrows.

DESCRIPTION OF THE PREFERRED EMBODIMENTS

Figure 1:
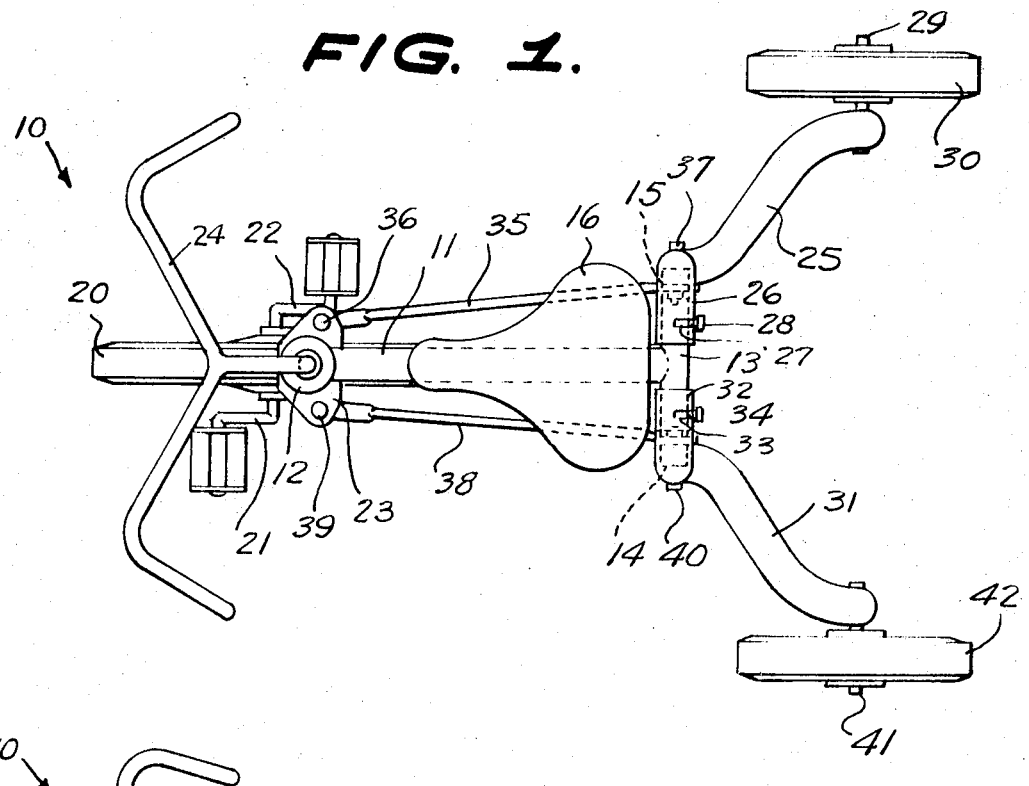
FIG. 1 is a top plan view of the invention.
Figure 2:
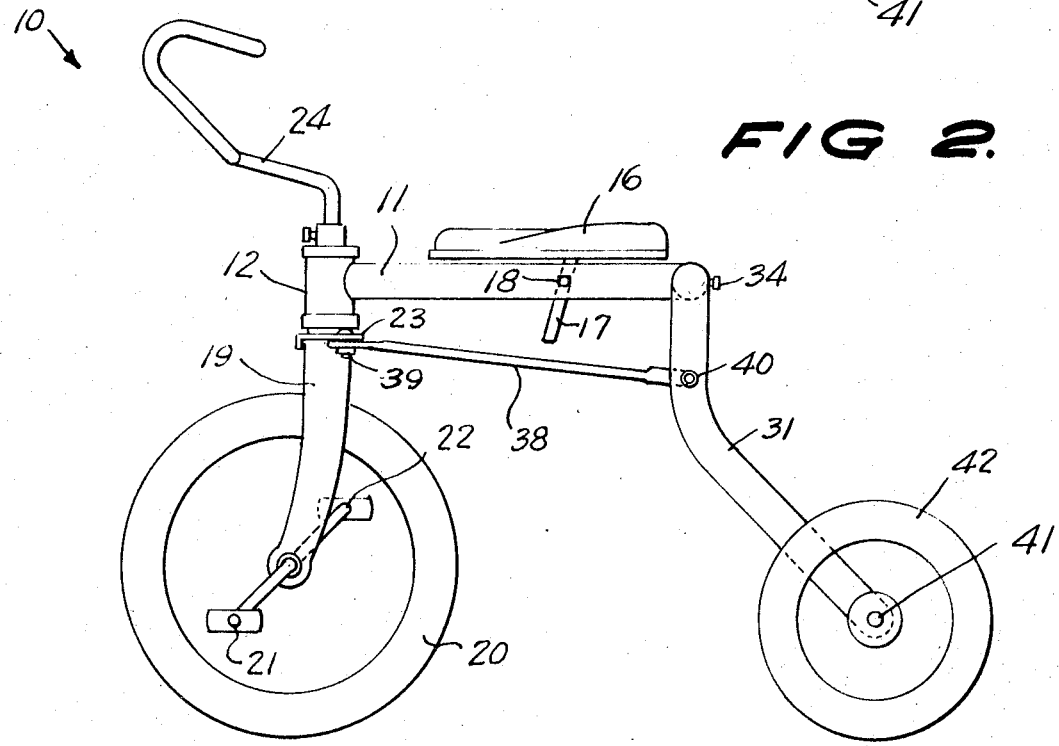
FIG. 2 is a side elevation of the invention.

Referring now to the drawings in detail wherein like reference characters indicate like parts throughout the several figures, the reference numeral 10 indicates generally a velocipede constructed in accordance with the invention.

The velocipede 10 includes a generally horizontal tubular frame member 11 having a vertical tubular bushing 12 integrally secured to its forward end and a transverse tubular T-member 13 secured to its rear end and carrying oppositely disposed tubular support elements 14, 15 on opposite ends thereof.

A seat 16 is provided with a depending seat post 17 which extends through the frame member 11 and is secured therein by a setscrew 18 for vertical adjustment.

A fork 19 is mounted in the bushing 12 for rotation about a vertical axis and has a front wheel 20 rotatably mounted in the lower end thereof for driving by a pair of foot pedal crank arms 21, 22. A generally horizontal plate 23 is secured to the fork 19 under the bushing 12 and rotates with the fork 19 when the handle bars 24 are rotated.

A wheel support arm 25 is formed of tubular material and has a right angularly extending upper end portion 26 mounted for rotary movement on the support element 15. A slot 27 is formed in the upper end portion 26 adjacent the terminal end thereof and a set screw 28 extends through the slot 27 into the support element 14 to permit the arm 25 to have limited rotary movement about the support element 15 without becoming laterally displaced therefrom.

A stub axle 29 extends horizontally through the lower end portion of the arm 25 and a rear wheel 30 is mounted for rotation on the stub axle 29.

A second wheel support arm 31 is provided with a tubular horizontally extending upper end portion 32 which is journaled on the support element 14 for rotary movement about a horizontal transverse axis. A slot 33 is formed in the upper end portion 32 adjacent to the terminal end thereof and a setscrew 34 extends through the slot 33 into the support element 14 to permit the wheel support arm 31 to have limited rotary movement about the support element 14 without becoming dislodged therefrom.

A link 35 has its forward end connected to the plate 23 by a pivot 36 and has its rear end connected to the arm 25 by a pivot 37. A second link 38 has its forward end connected to the plate 23 by a pivot 39 and its rear end connected to the arm 31 by a pivot 40.

A stub axle 41 extends horizontally from the lower rear end of the arm 31 and has a rear wheel 42 journaled thereon.

The arms 25, 31 extend downwardly from the frame 11 and slightly rearwardly therefrom so that the rear wheels 30, 42 lie a substantial distance below the pivotal mounting of the arms 25, 31.

In the use and operation of the invention, the velocipede 10 is ridden in the conventional manner with the rider sitting upon the seat 16 and his feet driving the foot pedal crank arms 21 22. Upon turning of the handle bars 24, the plate 23 is also turned pulling the link 35 forwardly and pushing the link 38 rearwardly in the case of a left turn and moving the links 35, 38 oppositely in the case of a right turn. Upon making a left turn as the link 35 is drawn forwardly, the arm 25 is swung forwardly to a position more nearly underlying the rear end of the frame 11 so that the wheel 30 is moved downwardly with respect to the frame 11 elevating the frame 11 on its rear end on that side. Conversely rearward movement of the link 38 moves the arm 31 rearwardly swinging the wheel 42 upwardly toward the frame 11 thus lowering the frame 11 on the left side causing the velocipede 10 to assume the position illustrated in FIG. 3 leaning into the curve.

The mounting of the arms 25, 31 for pivotal movement about an axis to the rear of and at the height of the frame 11 gives substantially greater leverage to the movement of the wheels 30, 42 so that the strain on the handle bars 24 is much less.

The rider of the velocipede 10 will feel the leaning thereof on making turns in exactly the same way that a bicycle leans on making turns and hence he will be trained to expect this bicycle type motion when first riding a bicycle after being trained on the velocipede 10.

The specific mounting of the arms 25, 31 to the support elements 13, 14 could be varied in a number of ways in order to obtain the same results in the velocipede 10.

Having thus described the preferred embodiments of the invention it should be understood that numerous structural modifications and adaptations may be resorted to without departing from the spirit of the invention.

What is claimed is:

1. A training velocipede which comprises a substantially horizontal singular tubular frame member extending from front to rear, a front wheel fork, means mounting said fork to the front end of said frame member for rotary movement about a vertical axis, a handle bar connected to said fork for rotating said fork to steer said velocipede, a foot driven steerable front wheel journaled in said fork, said frame member forming a T-shaped horizontal pivot member at the rear end of said frame member a pair of downwardly and rearwardly projecting wheel support arms, means securing said arms on the opposite sides of said T-shaped pivot member for rotary movement about a horizontal axis, a rear wheel mounted on the lower rear end of each of said arms for supporting the rear of said velocipede and means connecting said fork to said arms for oppositely swinging said arms upon steering movement of said fork to lean said velocipede in the direction steered wherein the means connecting said arms to said fork includes a pair of oppositely disposed link arms vertically pivoted to said fork and horizontally pivoted to an intermediate portion of said arms.

2. A device as claimed in claim 1 wherein said rear wheels are positioned substantially below the pivot mountings of said arms.

3. A device as claimed in claim 1 wherein stub axles are provided on the lower end of each of said arms for journaling one of said rear wheels thereon.